United States Patent
Zhang et al.

(10) Patent No.: US 10,003,239 B1
(45) Date of Patent: Jun. 19, 2018

(54) DOUBLY-FED INDUCTION GENERATOR SYSTEM FOR A GAS TURBINE

(71) Applicant: General Electric Company, Schenectady, NY (US)

(72) Inventors: Hua Zhang, Greer, SC (US); Fabien Thibault Codron, Simpsonville, SC (US); Gunnar Leif Siden, Greenville, SC (US); Frank Douglas Beadie, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 15/381,982

(22) Filed: Dec. 16, 2016

(51) Int. Cl.
| | |
|---|---|
| *F02N 11/04* | (2006.01) |
| *H02K 23/52* | (2006.01) |
| *H02P 9/04* | (2006.01) |
| *H02K 7/18* | (2006.01) |
| *H02P 9/00* | (2006.01) |
| *F02D 29/06* | (2006.01) |
| *F01D 15/10* | (2006.01) |

(52) U.S. Cl.
CPC .......... *H02K 7/1823* (2013.01); *H02P 9/007* (2013.01)

(58) Field of Classification Search
USPC .......................................... 290/32, 40 C, 52
See application file for complete search history.

(56) References Cited

U.S. PATENT DOCUMENTS

| | | | |
|---|---|---|---|
| 8,093,739 B2 | 1/2012 | Gilchrist | |
| 8,264,209 B2* | 9/2012 | Kretschmann | H02P 9/007 290/40 C |
| 8,461,709 B2* | 6/2013 | Birkemose | H02P 9/007 290/44 |
| 2008/0150285 A1* | 6/2008 | Corcelles Pereira | H02J 3/1807 290/44 |
| 2009/0273192 A1* | 11/2009 | Guven | H02P 9/007 290/40 C |
| 2010/0176606 A1* | 7/2010 | Gilchrist, III | H02J 3/08 290/40 C |
| 2011/0285132 A1* | 11/2011 | Waszak | F03D 7/028 290/52 |
| 2015/0108759 A1* | 4/2015 | Chemmangot | F01D 15/10 290/52 |
| 2015/0372481 A1 | 12/2015 | Roesner | |
| 2016/0273456 A1 | 9/2016 | Zhang | |

* cited by examiner

*Primary Examiner* — Pedro J Cuevas
(74) *Attorney, Agent, or Firm* — Eversheds Sutherland (US) LLP

(57) ABSTRACT

The present application provides a doubly-fed induction generator system for a multi-shaft gas turbine engine. The doubly-fed induction generator system may include a first doubly-fed induction generator in communication with a first shaft of the multi-shaft gas turbine engine, a first rotor of the first doubly-fed induction generator in communication with a converter via a first rotor bus, and a first breaker on the first rotor bus. The first doubly-fed induction generator acts as a generator or a motor depending in part upon the position of the first breaker.

20 Claims, 3 Drawing Sheets

DOUBLY-FED INDUCTION GENERATOR SYSTEM FOR A GAS TURBINE

TECHNICAL FIELD

The present application and the resultant patent relate generally to gas turbine engines and more particularly relate to a doubly-fed induction generator system for use with a multi-shaft gas turbine engine for rapid start-up, flexible operation, increased hot day power output, and improved part load efficiency.

BACKGROUND OF THE INVENTION

Generally described, a two-shaft or a multi-shaft gas turbine engine may have a first shaft driven by a gas generator or a high pressure turbine and a separate second shaft driven by a power turbine or a low pressure turbine. Specifically, the high pressure turbine may drive the compressor and the low pressure turbine may drive an external load such as a liquefied natural gas compressor, an electrical generator, and the like. One issue with a two-shaft or a multi-shaft gas turbine engine may be an occasional power imbalance between the high pressure turbine and the low pressure turbine. Such a power imbalance particularly may be of issue on hot days when high power demands require the compressor to increase the overall mass flow rate of the incoming airstream for increased power generation.

SUMMARY OF THE INVENTION

The present application and the resultant patent thus provide a doubly-fed induction generator system for a multi-shaft gas turbine engine. The doubly-fed induction generator system may include a first doubly-fed induction generator in communication with a first shaft of the multi-shaft gas turbine engine, a first rotor of the first doubly-fed induction generator in communication with a converter via a first rotor bus, and a first breaker on the first rotor bus. The first doubly-fed induction generator may act as a generator or as a motor depending in part upon the position of the first breaker.

The present application and the resultant patent further provide a method of operating a multi-shaft gas turbine engine. The method may include the steps of positioning a doubly-fed induction generator on a first shaft of the multi-shaft gas turbine engine, operating the doubly-fed induction generator as a motor during start-up of the multi-shaft gas turbine engine, and operating the doubly-fed induction generator as a generator during full load operations of the multi-shaft gas turbine engine.

The present application and the resultant patent further provide a doubly-fed induction generator system for a multi-shaft gas turbine engine. The doubly-fed induction generator system may include a first doubly-fed induction generator in communication with a first shaft of the multi-shaft gas turbine engine, a first rotor of the first doubly-fed induction generator in communication with a converter via a first rotor bus, and a second generator in communication with a second shaft of the multi-shaft gas turbine engine.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
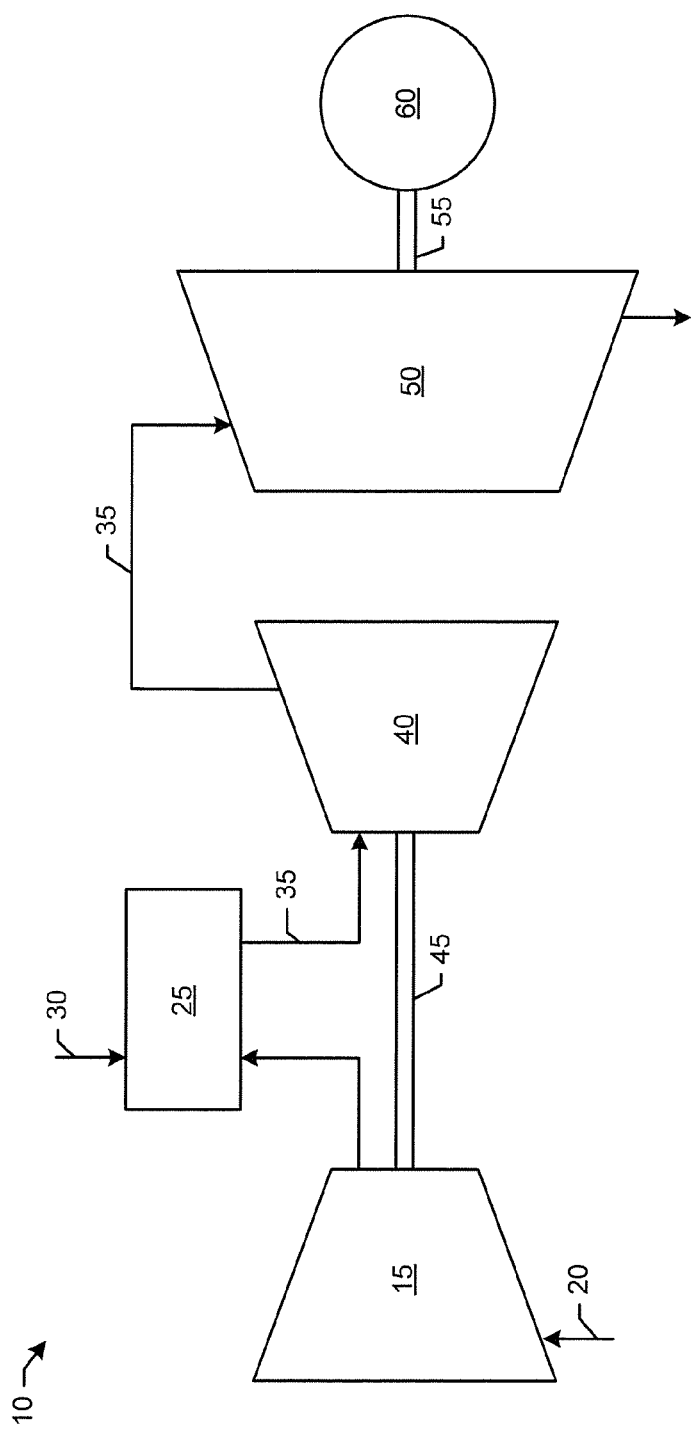
FIG. 1 is a schematic diagram of a two-shaft gas turbine engine.

Referring now to the drawings, in which like numerals refer to like elements throughout the several views, FIG. 1 shows a schematic diagram of a multi-shaft gas turbine engine 10 as may be described herein. In this example, the multi-shaft gas turbine engine may be a two-shaft gas turbine engine and the like. The multi-shaft gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the multi-shaft gas turbine engine 10 may include any number of combustors arranged in a circumferential array and the like. The flow of combustion gases 35 is delivered to a high pressure turbine 40. The flow of combustion gases 35 drives the high pressure turbine 40 so as to produce mechanical work. The mechanical work produced in the high pressure turbine 40 drives the compressor 15 via a first shaft 45. The flow of combustion gases 35 then may be delivered to a low pressure turbine 50. The flow of combustion gases 35 drives the low pressure turbine 50 so as to produce mechanical work. The mechanical work produced in the low pressure turbine 50 may drive an external load such as a liquefied natural gas compressor, an electrical generator, and the like via a second shaft 55.

The multi-shaft gas turbine engine 10 may use natural gas, various types of syngas, liquid fuels, and/or other types of fuels and blends thereof. The multi-shaft gas turbine engine 10 may have different configurations and may use other types of components. Multiple gas turbine engines, other types of turbines, and other types of power generation equipment also may be used herein together.

Figure 2:
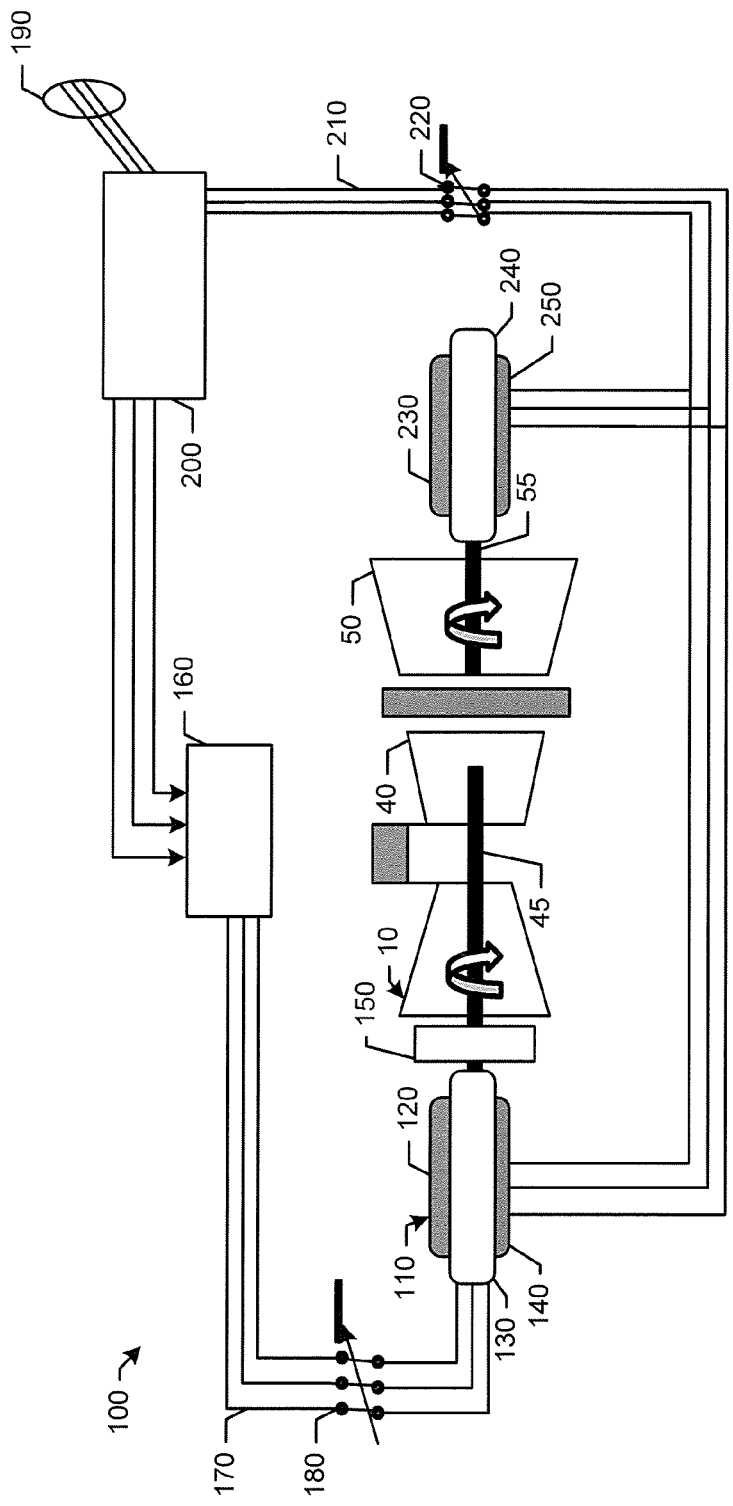
FIG. 2 is a schematic diagram of a doubly-fed induction generator system as may be described herein for use with a two-shaft gas turbine engine.

FIG. 2 is a schematic diagram of a doubly-fed induction generator system 100 as may be described herein. The doubly-fed induction generator system 100 may be used with the multi-shaft turbine engine 10 described above and with other types of turbines. The doubly-fed induction generator system 100 may include a first doubly-fed induction generator 110 operating as a first generator 120. In this example, the first generator 120 may produce about five (5) megawatts of power. Other capacities may be used herein. The first generator 120 may include a first rotor 130 positioned for rotation within a first stator 140. The first rotor 130 of the first generator 120 may be driven by the first shaft 45. A turning gear 150 also may be positioned about the first shaft 45 for start-up operations. The first rotor 130 of the first generator 120 may be in communication with a converter 160. The converter 160 may be of conventional design. The first rotor 130 may be in communication with the converter 160 via a first rotor bus 170 and slip rings. The first rotor bus 170 may have a first breaker 180 thereon. The converter 160 may be in communication with an electrical grid 190. The converter 160 may be in communication with the electrical grid 190 via a number of conventional transformers and switches 200. The first stator 140 of the first generator 120 may be in communication with the transformers and the switches 200 via a stator bus 210. A second breaker 220 may be positioned on the stator bus 210. The doubly-fed induction generator 110 may operate as a generator or a motor depending upon the position of the first breaker 180 and the resulting torque direction between the positions of the first rotor 130 and the first stator 140 with respect to the rotating electromagnetic fields. Other components and other configurations may be used herein.

The doubly-fed induction generator system 100 also may include a second generator 230. The second generator 230 may be a doubly-fed induction generator or the conventional generator 60 described above. In this example, the second generator 230 may be a conventional generator producing about 120 megawatts of power. Other capacities may be used herein. The second generator 230 may be positioned downstream of the low pressure turbine 250. The second generator 230 includes a second rotor 240 positioned for rotation within a second stator 250. The second rotor 240 may be driven by the second shaft 55 of the multi-shaft gas turbine engine 10. The second stator 250 may be in communication with the electrical grid 190 and the transformers and the switches 200 via the stator bus 210. Other components and other configurations may be used herein.

During start-up, the first generator 120 may be operated as a starting motor for the multi-shaft gas turbine engine 10. Given such, the first breaker 180 may be opened. The turning gear 150 may begin to rotate the first shaft 45. The doubly-fed induction generator 110 then may begin to drive the first shaft 45 as a synchronized motor at the designed frequency. The frequency then may be increased to accelerate the multi-shaft gas turbine engine 10 to light off. After light off, the doubly fed induction generator 110 may work with power generated by combustion gas to drive the gas turbine to full speed—no load operation, and to full speed—full load operation. Given the additional power from the doubly fed induction generator 110, the start-up process can be quicker than conventional processes.

At the loaded operation mode, depending upon the power balance, the doubly-fed induction generator 110 may operate as a generator with the first breaker 180 closed to send power to the electrical grid 190 or as a motor with the first breaker 180 open to drive the compressor 115. For example on a hot day, the doubly-fed induction generator 110 may act as a motor to help the compressor 15 generate more mass flow. With more mass flow, the turbine can produce almost twice the amount of power used to increase the compressor air mass flow. This results in an overall power increase from the gas turbine. On a cold day or at partial load, the doubly-fed induction generator 110 may be operated as a generator to improve overall system efficiency as the compressor, for example, may be able to operate at lower speed with wider open inlet guide vanes and the like.

Figure 3:
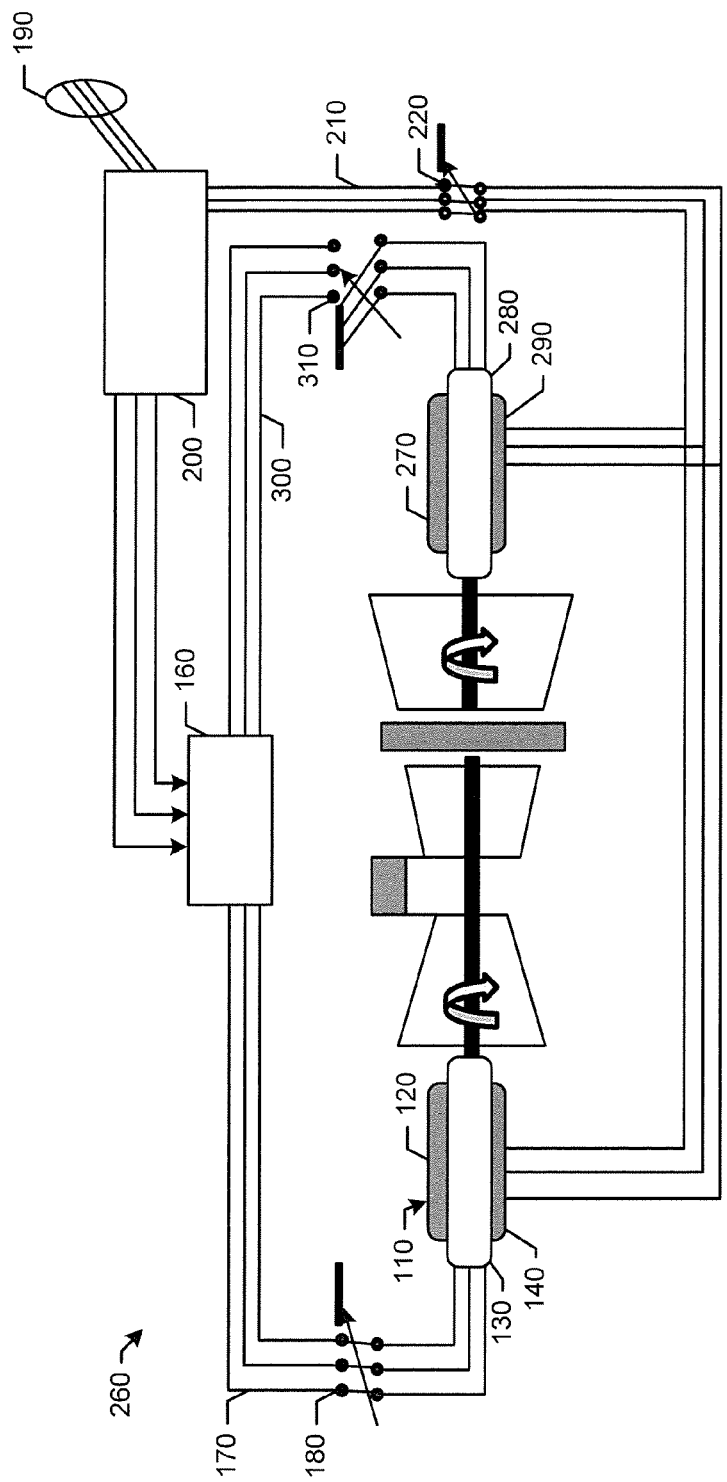
FIG. 3 is a schematic diagram of an alternate embodiment of a doubly-fed induction generator system as may be described herein for use with a two-shaft gas turbine engine.

FIG. 3 shows a further embodiment of a doubly-fed induction generator system 260 as may be described herein. In this example, the doubly-fed induction generator system 260 may include the first doubly-fed induction generator 110 as the first generator 120 but with a second doubly-fed induction generator 270 as the second generator 230. The second doubly-fed induction generator 270 may include a second doubly-fed induction generator rotor 280 and a second doubly-fed induction generator stator 290. The second doubly-fed induction generator rotor 280 may be in communication with the converter 160 via a second rotor bus 300. A third breaker 310 may be positioned on the second rotor bus 300. The second doubly-fed induction generator stator 290 may be in communication with the stator bus 210 and slip rings. In this configuration, the lower pressure turbine also may drive a compressor such as in liquefied natural gas production. Other components and other configurations may be used herein.

At start up, the first breaker 180 and the third breaker 310 may be opened while the second breaker 220 is closed for the stators 140, 290 to be powered by the electrical grid 190. As described above, the doubly-fed induction generators 110, 210 may be run as motors at various speeds to start the multi-shaft gas turbine engine 10. The use of the variable speed thus allows the elimination of a conventional torque converter and the like and speed up the start-up process. At loaded operation, the first doubly-fed induction generator 110 may run as a generator and the second doubly-fed induction generator 270 may run as a motor, or vice versa, depending upon the overall power balance. The two doubly fed induction generators can overcome the imbalance of mechanical power generated by the high pressure turbine and the low pressure turbine at different operating conditions, such as hot day conditions, full load condition, part load conditions, and the like.

The doubly-fed induction generator systems 100 described herein thus may improve overall gas turbine engine operation including hot day laps and partial load efficiency. Moreover, the doubly-fed induction generators 100 may provide a better overall gas turbine degradation curve. Similarly, the doubly-fed induction generator systems 100 may provide for a rapid start-up with an overall smaller footprint and cost savings.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A doubly-fed induction generator system for a multi-shaft gas turbine engine, comprising:
   a first doubly-fed induction generator in communication with a first shaft of the multi-shaft gas turbine engine;
   a first rotor of the first doubly-fed induction generator in communication with a converter via a first rotor bus; and
   a first breaker on the first rotor bus;
   wherein the first doubly-fed induction generator acts as a generator or a motor depending in part upon the position of the first breaker.

2. The doubly-fed induction generator system of claim 1, wherein the converter is in communication with an electrical grid.

3. The doubly-fed induction generator system of claim 2, wherein a first stator of the first doubly-fed induction generator is in communication with the electrical grid via a stator bus.

4. The first doubly-fed induction generator system of claim 3, wherein the stator bus comprises a second breaker thereon.

5. The doubly-fed induction generator system of claim 4, wherein the first rotor bus and the stator bus are in communication with one or more switches and transformers.

6. The doubly-fed induction generator system of claim 1, wherein the first rotor is in communication with a high pressure turbine of the multi-shaft gas turbine engine via the first shaft.

7. The doubly-fed induction generator system of claim 1, further comprising a second generator in communication with a second shaft of the multi-shaft gas turbine engine.

8. The doubly-fed induction generator system of claim 7, wherein the second generator comprises a second doubly fed induction generator.

9. The doubly-fed induction generator system of claim 8, wherein the second doubly-fed induction generator comprises a second rotor in communication with the converter via a second rotor bus.

10. The doubly-fed induction generator system of claim 9, wherein the second rotor is in communication with a low pressure turbine of the gas turbine engine via the second shaft.

11. The doubly-fed induction generator of claim 9, wherein the second rotor bus comprises a third breaker thereon.

12. The doubly-fed induction generator of claim 11, wherein the second doubly-fed induction generator acts as a generator or a motor depending in part upon the position of the third breaker.

13. The doubly-fed induction generator system of claim 8, wherein a second stator of the second doubly-fed induction generator is in communication with an electrical grid via a stator bus.

14. The double-fed induction generator system of claim 13, wherein the stator bus is in communication with one or more switches and transformers.

15. A method of operating a multi-shaft gas turbine engine, comprising:
   positioning a doubly-fed induction generator on a first shaft of the multi-shaft gas turbine engine;
   operating the doubly-fed induction generator as a motor during start-up of the multi-shaft gas turbine engine; and
   operating the doubly-fed induction generator as a generator during full load operations of the multi-shaft gas turbine engine.

16. A doubly-fed induction generator system for a multi-shaft gas turbine engine, comprising:
   a first doubly-fed induction generator in communication with a first shaft of the multi-shaft gas turbine engine;
   a first rotor of the first doubly-fed induction generator in communication with a converter via a first rotor bus; and
   a second generator in communication with a second shaft of the multi-shaft gas turbine engine.

17. The doubly fed induction generator system of claim 16, wherein the second generator comprises a second doubly fed induction generator.

18. The double fed induction generator system of claim 17, wherein the second doubly-fed induction generator comprises a second rotor.

19. The double fed induction generator system of claim 18, wherein the second rotor is in communication with the converter.

20. The doubly-fed induction generator system of claim 19, wherein the converter is in communication with an electrical grid.

* * * * *